(12) United States Patent
Arai (10) Patent No.: US 6,472,656 B2
(45) Date of Patent: Oct. 29, 2002

(54) DEVICE FOR MEASURING TORQUE OF ROTATING BODY AND METHOD FOR MEASURING TORQUE

(75) Inventor: Tooru Arai, Fujisawa (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/895,209

(22) Filed: Jul. 2, 2001

(65) Prior Publication Data

US 2002/0000513 A1 Jan. 3, 2002

(30) Foreign Application Priority Data

Jul. 3, 2000 (JP) ........................................ 2000-201250

(51) Int. Cl.⁷ ................................................ G01D 5/34
(52) U.S. Cl. .......................... 250/231.14; 73/862.321; 356/152.3
(58) Field of Search ..................... 250/231.14, 231.13, 250/231.1, 231.16, 233, 236; 73/862.321, 862.324, 862.193; 356/152.1, 152.3; 341/13

(56) References Cited

U.S. PATENT DOCUMENTS

| | | | |
|---|---|---|---|
| 4,637,264 A | * 1/1987 | Takahashi et al. | ........ 250/231.1 |
| 4,650,996 A | * 3/1987 | Maehara et al. | ............ 250/225 |
| 5,523,561 A | * 6/1996 | Ironside et al. | .......... 250/231.1 |
| 5,705,810 A | * 1/1998 | Wang et al. | ............. 250/231.1 |

* cited by examiner

*Primary Examiner*—Kevin Pyo
*Assistant Examiner*—Seung C. Sohn
(74) *Attorney, Agent, or Firm*—Oliff & Berridge, PLC (57) ABSTRACT

A sensor with a strain gage 106 is disposed on an inner circumferential surface of a distortion generating body 100 which is a half-blindly hollowed cylinder having a prescribed thickness and diameter between a driving flange 101 to be fixed to a rotating body and a driven flange 102. The sensor converts a physical quantity corresponding to torque acting on the cylinder into an electrical signal. And the electrical signal is further converted into an optical signal by a light emitting element 113 and transmitted to a stationary section. The optical signal transmitted from the rotary section is made incident on a circumference of an optical fiber 115. The light made incident on the circumference of the optical fiber 115 is transmitted to an end of the optical fiber. The light which has reached the end is received at a light-into-electricity conversion element 131 to be converted into an electrical signal. Thus, a measured value of torque is obtained. Accordingly, torque of a rotating body can be measured in a noncontact manner with low electric power.

17 Claims, 6 Drawing Sheets

DEVICE FOR MEASURING TORQUE OF ROTATING BODY AND METHOD FOR MEASURING TORQUE

BACKGROUND OF THE INVENTION

1. Field of the Invention

The invention relates to a torque measuring device which measures torque of a rotating body, more particularly to a device for measuring torque of a rotating body, in which electricity and measurement signals are transmitted and received in a noncontact manner between a rotary section and a stationary section in order to measure torque of the rotating body with a strain gage, and to a method for measuring the torque.

2. Description of Related Art

Conventionally, a device, in which a plurality of strain gages connected so as to constitute a Wheatstone bridge circuit are attached by means of adhesive to a cylindrical distortion generating body connected between a rotating shaft and a load shaft driven by the rotating shaft and in which thereby a torsion quantity generated in the distortion generating body is converted into electricity quantity as torque quantity of a rotating body and transmitted to the stationary section, has been used for measurement of the torque of the rotating body. In this measuring device, important are a method for transmitting required electric power from a stationary section to a circuit on a rotary section and a method for transmitting to the stationary section an electrical signal gained by converting a torque quantity of the rotary section into electricity quantity where various problems have been pointed out in conventional mechanical contact methods.

In order to solve the above-mentioned problems with the mechanical methods, a method for converting an electrical signal of a rotating body into an optical signal and transmitting the optical signal to a stationary section: "Detection Signal Transmission Device for Physical Quantity-Electrical Quantity Converter for Rotating Body" has been proposed (Japanese Patent Laid-open No. Hei 6-301881). Hereinafter, measuring mechanism of the conventional "Detection Signal Transmission Device for Physical Quantity-Electrical Quantity Converter for Rotating Body" will be described based on FIG. 7.

Figure 7:
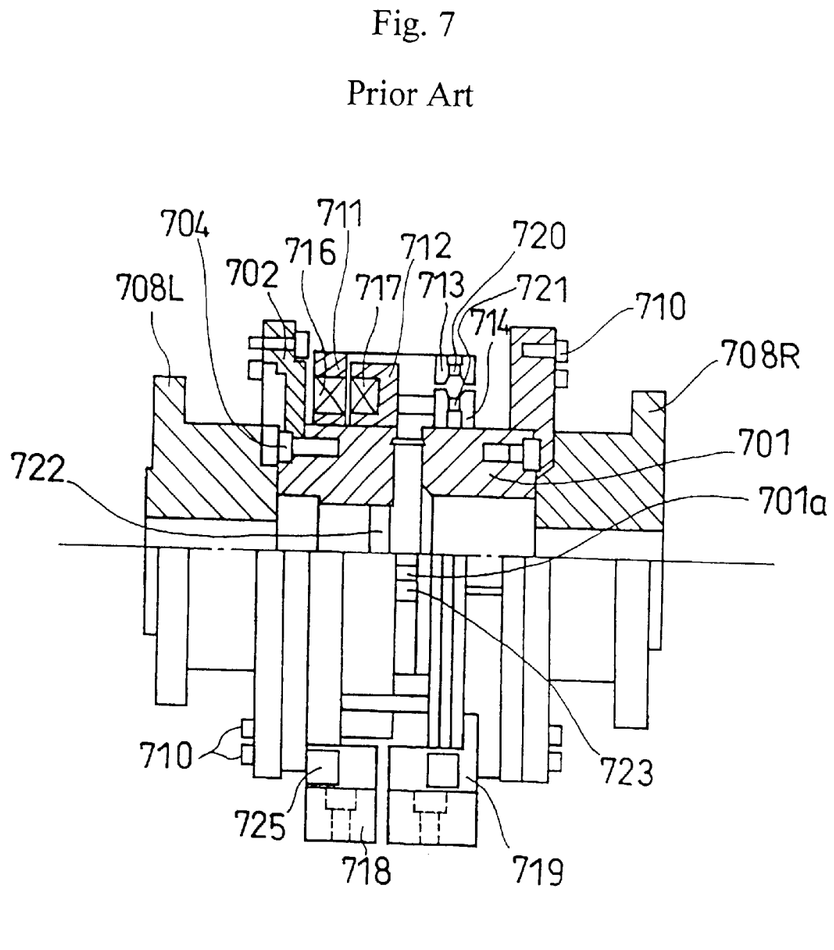
FIG. 7 is a sectional view of an example of the conventional "Detection Signal Transmission Device for Physical Quantity-Electrical Quantity Converter for Rotating Body".

The measuring mechanism comprises five main parts including a torque transmission part, a photo coupling part, a torque detecting part, signal processing circuit part and electricity receiving part. The main parts relating to the invention will be explained as follows.

In FIG. 7, the torque transmission part is constituted as a so-called flexible coupling mechanism providing a connecting function with flexibility. The main mechanism thereof is formed symmetrically with respect to a distortion generating body 701.

The photo coupling part is a mechanism which transmits a measured signal from a rotary section to a stationary section. A signal transmission part on the rotary section is constituted by a light emitting side ring 714 attached to the distortion generating body 701 and a plurality of light emitting diodes 721 which are electricity-into-light conversion elements and attached to the light emitting side ring 714.

Moreover, a signal receiving part on the stationary section is constituted by a light receiving side ring 713 and a plurality of photodiodes 720 which are light-into-electricity conversion elements and attached to the light receiving side ring 713. The light emitting side ring 714 of the signal transmission part is formed such that its inner periphery is fixed to the distortion generating body 701, and its outer periphery is shaped substantially bowl-like in cross-section. The light emitting diodes 721 are attached to a bottom part of the bowl shape.

On the other hand, the ring 713 of the signal receiving part is formed such that its inner periphery is shaped substantially bowl-like, and the photodiode 720 are attached to a bottom part of the bowl shape. These two kinds of rings, namely the light receiving side ring 713 and the light emitting side ring 714 are arranged so that the substantially bowl-shaped opening portions face each other and are positioned close to each other. Eight pieces of the photodiodes 720 are attached to the inner periphery of the light receiving ring 713. And, five pieces of the light emitting diodes 721 are attached along the entire periphery of the ring and are simultaneously lightened.

The distortion generating body 701 is a cylinder with a large diameter as a whole, where a distortion generating part 701a has a reduced thickness at its center area in the axial direction, and in the area with the reduced thickness, two side surfaces symmetrical with respect to the axis of the cylinder are shaved into flat surfaces. Strain gages 723 are attached to the flat portions and are incorporated into a Wheatstone bridge circuit 723 having two attached sheets (a pair) of the strain gages 723 as opposing sides.

The signal processing circuit 722 includes a circuit where a detection signal detected by the strain gages 723 attached to the distortion generating part 701a as the torque detecting part is appropriately amplified, waveform-shaped and signal-processed and where the processed signal is outputted to the photo coupling part comprising the light emitting diodes 721 and the photodiodes 720.

The electricity receiving part is constituted by a noncontact-type rotary transformer. An electricity transmitting ring 711 on the stationary section and an electricity receiving ring 712 on the rotary section are arranged facing each other and close to each other. At opposing side surfaces of the rings 711,712, a pair of substantially U-shaped ferrite cores (not shown) are mounted with their openings facing each other. An electricity transmitting coil 716 and an electricity receiving coil 717 are wound in a ring-like manner within respective spaces inside the substantially U-shaped ferrite cores.

In the conventional method for converting an electrical signal of the rotary section into an optical signal and transmitting the optical signal to the stationary section, there has been such a problem that a plurality of electricity-into-light conversion elements are arranged on the rotary section leading to an increased power consumption on the rotary section and therefore the size of a rotary transformer which transmits electric power from the stationary section to the rotary section has to be increased. There has been another problem that the rotary transformer for transmitting power and a light conversion part for transmitting a torque signal from the rotary section to the stationary section are separately structured, with the result that the device had to be increased in size and that it was difficult to properly position each part.

Moreover, since there were eight pieces of light receiving rings mounted at equal intervals and five pieces of light emitting diodes mounted at equal intervals throughout the entire ring and so on, making the manufacturing difficult and it was required to select elements which have small variance in characteristics from each other and which have a wide range (for example ±100 degrees) of directivity characteristics to uniformly transmit light.

Further, unless the five pieces of light emitting diodes are lightened simultaneously, the light emitting region is not shaped in an arch band of about 45°, forcing control of a drive circuit to be complicated. And, in case one or more of the light emitting diodes or the light receiving diodes fail to duly function, torque can not be detected at some places causing a problem.

Furthermore, the distortion generating body is a cylinder with a large diameter as a whole, but the distortion generating part which is a torque detecting part has a reduced thickness at its center area in the axial direction, and in the area with the reduced thickness, two side surfaces symmetrical with respect to the axis of the cylinder are shaved into flat surfaces, on which stress is concentrated causing a strength problem.

SUMMARY OF THE INVENTION

It is an object of the invention to provide a device having a structure in which electric power is efficiently transmitted from a stationary section to a rotary section rotating at a high speed and a circuit in which a signal of an electrical quantity converted from a torque quantity detected at the rotary section is transmitted to the stationary section without deteriorating the S/N ratio.

Accordingly, it is an object of the present invention to provide a torque measuring device to measure rotating torque and at the same time to obtain a method for measuring torque of a rotating body with this torque measuring device in order to solve the above mentioned problems.

In order to achieve the above mentioned object, a torque measuring device of the invention comprises a rotary section including a driving flange and a driven flange on both ends thereof; a half-blindly hollowed cylinder having a circumferential wall configured in section to form a U-defined open space between the flanges and having a prescribed thickness and a prescribed diameter at a very bottom of the open space; a torque detecting means disposed on an inner circumferential surface of the cylinder and adapted to convert a physical quantity corresponding to a value of torque acting on the cylinder portion into an electrical signal; a stationary section opposing an outer circumference of the driven flange; a set of rotary transformers comprising a first transformer core which is formed on the outer circumference of the driven flange and has a first groove and a second transformer core which is formed on an inner circumference of the stationary section and has a second groove; an optical signal conversion means composed of at least one electricity-into-light conversion element, disposed in the first groove and adapted to emit light according to an output of the torque detecting means; a light transmission means composed of an optical fiber, disposed in the second groove and adapted to receive the light from the optical signal conversion means; and a light detecting means to detect the light transmitted from the light transmission means.

Accordingly, the rotary transformer in which stress is not undesirably concentrated on a thin portion, strength of the thin portion is not lowered and in which a high torsional rigidity for high response to a sudden torque change is present can be structured with a compact dimension. Moreover, since the number of the conversion elements can be reduced, it is possible to reduce power consumption both on the stationary section and the rotary section and to significantly increase average time between failures, which leads to improvement of reliability.

In the torque measuring device, the light detecting means may comprise a light-into-electricity conversion element provided on at least one end surface of the optical fiber. As a result, the number of the parts is significantly reduced.

In the torque measuring device, the light detecting means may be disposed, together with the light transmission means, in the second groove formed on the second transformer core which opposes the driven flange and completes the set of rotary transformers with the first transformer core. According to this embodiment, it is possible to eliminate visible light leaking from the proximity of the connecting point of the light transmission means and the light detecting means.

In the torque measuring device, the optical signal conversion means provided in the first groove and the light transmission means and the light detecting means both provided in the second groove may be disposed so as not to protrude beyond an interface defined by the first and second transformer cores. Therefore, efficient transmission and receipt of electric power can be carried without lowering efficiency of the rotary transformers.

In the torque measuring device, the light transmission means and the light detecting means both provided in the second groove may be covered with a visible light cutoff filter. Accordingly, high S/N ratio can be obtained.

In the torque measuring device, the light transmission means may be set in such a way as to be wound in at least one turn within and along the second groove. As a result, torque is detectable anywhere regardless of the position of the rotating body.

And a method for measuring torque of the present invention comprises the steps of:

setting a torque detecting means, which converts a physical quantity corresponding to a torque value into an electrical signal, on an inner circumferential surface of a cylinder portion at a place where the cylinder portion has a smallest thickness in its circumferential wall between a driving flange and a driven flange;

converting the electrical signal from the torque detecting means into an optical signal by an electricity-into-light signal conversion means and transmitting the optical signal to a stationary section;

directing the optical signal transmitted from a rotary section onto a side face of an optical fiber provided in a groove formed on a transformer core which is provided in the stationary section in such a manner as to oppose the driven flange, thereby converting the optical signal into an electrical signal;

subjecting the electrical signal to a prescribed waveform-shaping process for a frequency modulated signal;

demodulating the frequency modulated signal; and retrieving the demodulated signal as an analogue signal by way of a prescribed circuit.

According to the method, it is possible to obtain a structure to efficiently transmit electric power from the stationary section to the rotary section rotating at a high speed and measure torque without deteriorating the S/N ratio of the signal converted from the torque quantity detected on the rotary section into an electrical quantity.

In the invention, a sensor with a strain gage is disposed on the inner circumferential surface of the hollowed cylinder having the circumferential wall configured in section to form a U-defined open space between the driving flange to be fixed to a rotating body and the driven flange and having a prescribed thickness at the very bottom of the open space. The sensor converts a physical quantity corresponding to a value of torque acting on the hollowed cylinder into an electrical signal. The electrical signal is further converted into an optical signal. Then, by the optical signal conversion means composed of at least one electricity-into-light conversion element, disposed in the first groove and adapted to emit light according to an output of the torque detecting means, the optical signal is made incident onto the side face of the optical fiber provided in the second groove formed on the second transformer core which is provided in the stationary section in such a manner as to oppose the driven flange. The optical signal made incident onto the side face of the optical fiber is then converted into an electrical signal by the light detecting means adapted to receive light reaching the end face of the optical fiber, whereby a torque value measured is obtained.

DETAILED DESCRIPTION OF PREFERRED EMBODIMENTS

Figure 1:
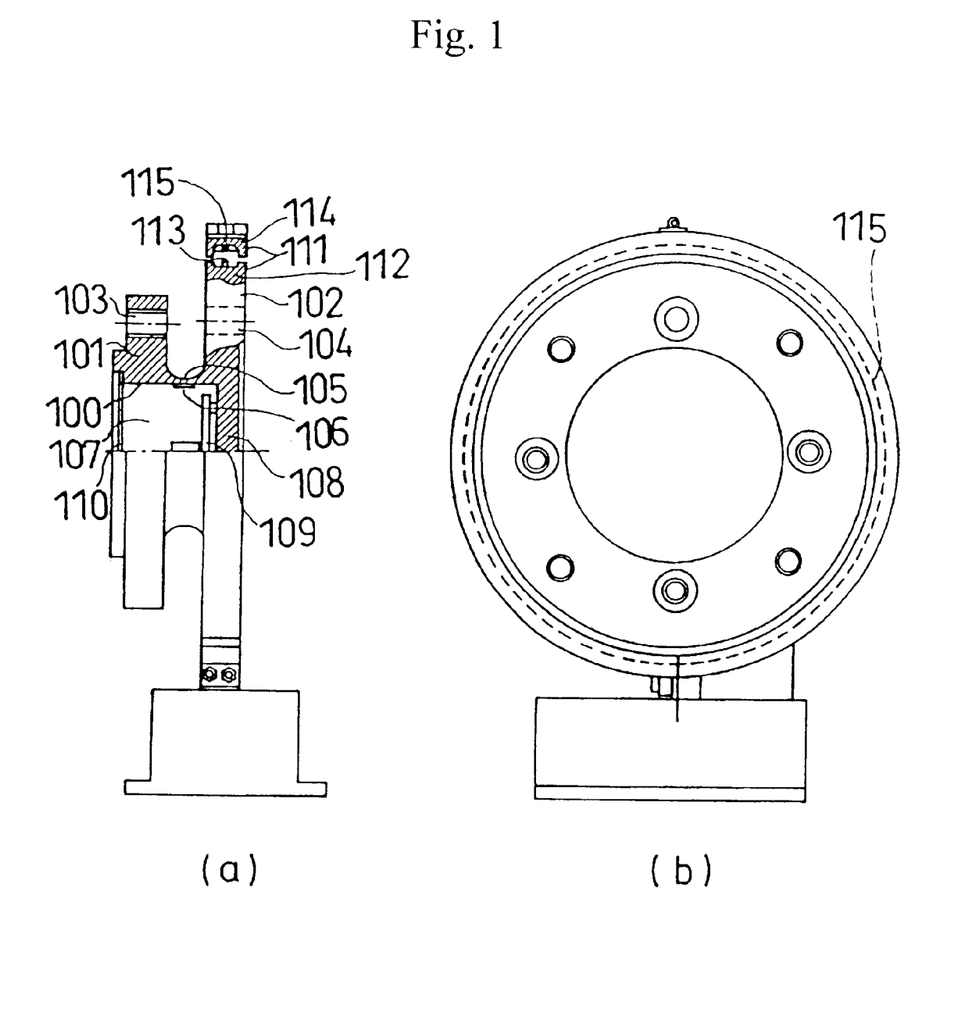
FIG. 1(a) is a side sectional view of a rotary section and a stationary section of a torque measuring device according to the invention and FIG. 1(b) is a front view of the torque measuring device.
Figure 2:
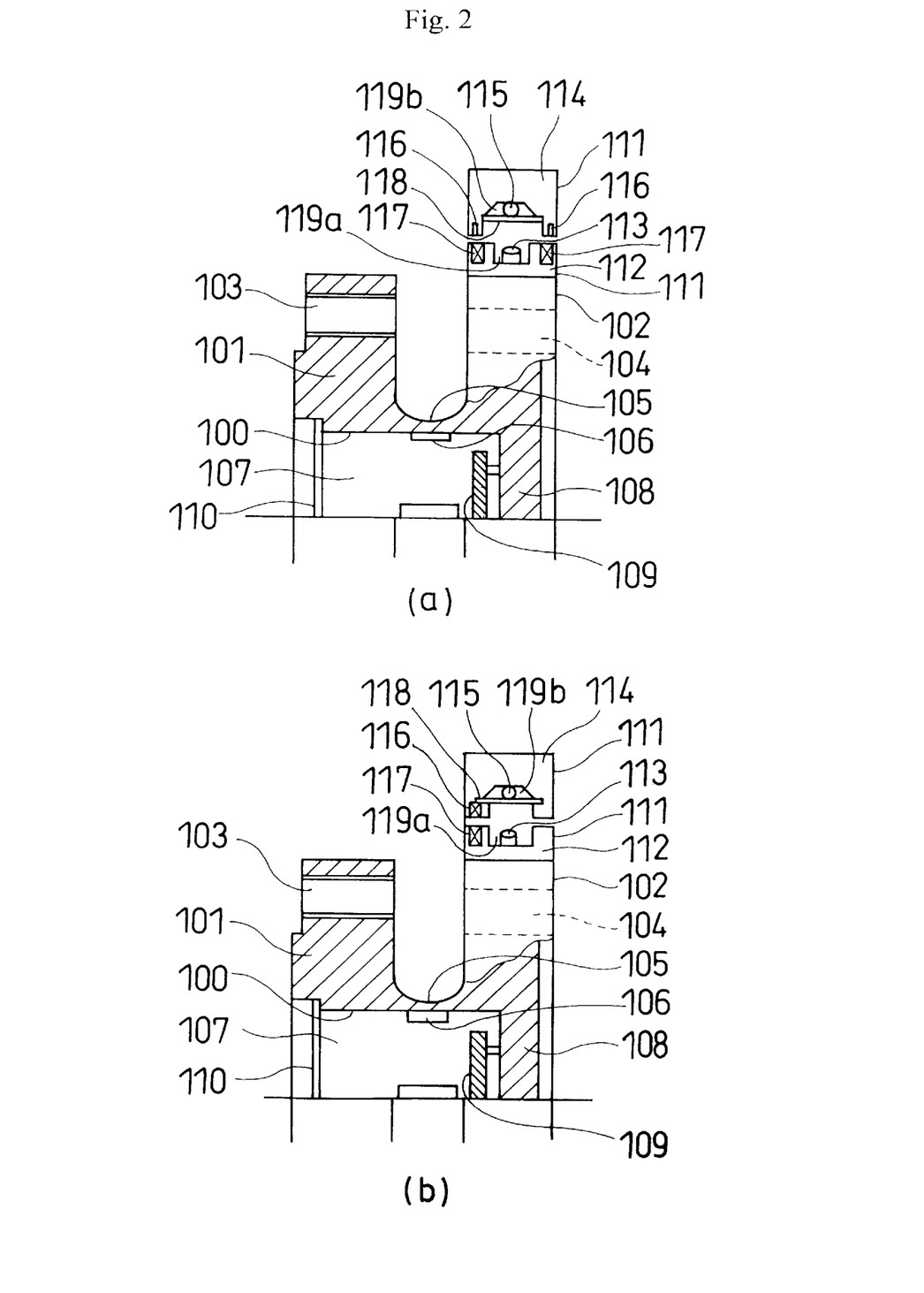
FIGS. 2(a) and 2(b) are enlarged views of the side sections of the rotary section and the stationary section in a torque measuring device according to the invention.

Hereinafter, embodiments of a torque measuring device according to the invention will be described with reference to the drawings. FIG. 1(a) is a sectional view showing a torque measuring device of the invention which is constituted as follows. A distortion generating body 100 is provided which is a half-blindly hollowed cylinder having a prescribed thickness and a prescribed diameter at a very bottom of an open space formed between a driving flange 101 and a driven flange 102. To an outer end surface of the driving flange 101, a connecting member at a driving side to be connected to drive line between a measurement roller of a chassis dynamo which is rotated, for example, by a wheel of a vehicle and a load such as a dynamometer, a brake mechanism or the like is connected by means of a threaded screw hole 103. A set of rotary transformer 111 comprises a magnetic core (first transformer core) 112 formed on an outer circumference of the driven flange 102 and another magnetic core (second transformer core) 114 formed on an inner circumference of the stationary section. The first transformer core 112 has a groove (first groove) 119a (shown in FIGS. 2(a) and 2(b)) which has at least one electricity-into-light conversion element 113 (optical signal conversion means) as will be mentioned later. A load member of the drive line is connected to the driven flange 102 by means of a threaded screw hole 104.

The second transformer core 114 of the rotary transformer provided on the stationary section and having a groove (second groove) 119b opposing the driven flange 102 is provided in a circle in such a manner as to face the driven flange 102 with a small gap therefrom. An optical fiber 115 (light transmission means) which will be described later is set in such a way as to be wound in at least one turn within and along the second groove 119b (shown in FIGS. 2(a) and 2(b)) provided in the second transformer core 114 on the stationary section, and a visible light cutoff filter 118 is arranged so as to close the second groove 119b. FIG. 1(b) is a front view showing the device according to the present invention where the optical fiber 115 (light transmission means) is set in such a way as to be wound in at least one turn within and along the second groove 119b provided in the second transformer core 114 on the stationary section.

As mentioned above, the rotary transformer 111 comprise parts 113,115 for transmitting and receiving an optical signal between the stationary section and the rotary section and parts 116, 117 for transmitting electric power from the stationary section to the rotary section.

The part 116 in the first transformer core on the stationary section indicates a primary winding for transmitting electric power to be used for an electronic circuit in the rotary section and the part 117 in the second transformer core on the rotary section indicates a secondary winding for receiving magnetic flux from the primary winding 116.

The driving flange 101 and the driven flange 102 are constituent elements of the distortion generating body 100 and they each have a larger outer diameter and thickness, in order to obtain high torsional rigidity, than the distortion generating body 100 which is a half-blindly hollowed cylinder having a prescribed thickness and diameter at an area between the driving flange 101 and the driven flange 102. A bottom of an open space formed between the driving flange 101 and the driven flange 102, where the distortion generating body 100 has a prescribed thickness and diameter, is processed to be arched by cutting or grinding in order to prevent concentration of stress on communicating parts between the flanges 101, 102 and the cylindrical distortion generating body 100. As seen from FIGS. 2(a) and 2(b), a thickness decreases gradually from the driving flange 101 toward the center of the bottom of the open space, a thickness decreases gradually the driven flange 102 toward the center of the bottom of the open space, and the bottom surface is arched in section with a smallest thickness positioned at its center. The bottom surface is shaped like a circle, an oval, a hyperbola, a parabola, etc. according to a diameter, material and length of the cylinder, the torque value and so on. A strain gage 106 is attached to the inner circumferential surface of the cylinder at a place opposing the center of the bottom of the open space as mentioned later.

Because the open space between the flanges 101, 102 has its bottom surface arched, stress is adapted to concentrate on one area corresponding to the center of the bottom surface. Considering stress is focussed on the one area, the distortion generating body 100 can be designed to have a larger thickness between the flanges than the conventional one which has a flat bottom surface at its open space. Moreover, since torsion or deflection of a shaft diminishes as mentioned above, it is possible to achieve high accuracy of measurement, and at the same time high torsional rigidity for having high response to sudden changes in torque can be obtained. Though the thickness of the distortion generating body 100 increases as it gets away from the center of the bottom, thereby lowering sensitivity of detecting strain, a precise strain quantity can be duly detected with a design to determine the thickness by allowing for the lowering of sensitivity.

In order to alleviate a harmful influence to the attached strain gages by the wind force and centrifugal force caused by high-speed rotation, a circuit substrate 109 on which an electronic circuit mentioned later is mounted is attached to a bottom 108 of an open space 107 of the cylindrical distortion generating body 100.

In order to prevent the attached strain gages from getting a bad effect by the wind force caused by the high-speed rotation and from deteriorating due to moisture, dust or the like from the outside, a lid 110 is provided to cover the open space 107 of the distortion generating body 100.

FIGS. 2(a) and 2(b) are enlarged sectional views of part of the torque measuring device according to the invention of FIG. 1(a). FIGS. 2(a) and 2b) show different embodiments, respectively. In FIG. 2(a), a primary winding 116 on the stationary section and a secondary winding 117 on the rotary section are each wound at two separate locations in the rotary transformer while in FIG. 2(b), the primary winding 116 on the stationary section and the secondary winding 117 on the rotary section are each wound at one location in the rotary transformer. Otherwise, there is no difference between FIG. 2(a) and FIG. 2(b), so the details of the invention will be explained with reference to FIG. 2(a). In FIG. 2(b), both the primary winding 116 on the stationary section and the secondary winding 117 on the rotary section are wound at one location closer to the driving flange 101, but, needless to say, they may be wound at another location away from the driving flange 101.

The rotary transformer 111 shown in FIGS. 2(a) and 2(b) is made of a magnetic material on both the stationary section and the rotary section and provided with various elements for transmitting an optical signal and transmitting electric power. However, a rotary transformer for transmitting power and a device for transmitting an optical signal may be separate bodies made of different materials from each other and put together.

For example, electric power may be transmitted by electromagnetic coupling in which a high frequency is used for transmission without involving a magnetic body on the stationary section to simplify the outer dimensions and the structure on the stationary section.

Alternatively, the primary winding may be omitted by employing a power transmitting method in which a second transformer core 114 in FIGS. 2(a) and 2(b) made in a circle of a non-magnetic metal comprising a groove for enclosing an optical fiber and a visible light cutoff filter is utilized as the primary winding of one turn and connected with the secondary winding on the rotary section, thereby constituting a power transmission transformer.

As shown in FIG. 2(a), the rotary transformer on the rotary section is located at the outer periphery of the driven flange and the first transformer core 112 has the first groove 119a which is provided therein with at least one electricity-into-light conversion element 113 (optical signal conversion means) such as a red color light emitting diode having a peak of light emitting efficiency around 660 nm in accordance with properties of the optical fiber 115 (light transmission means), as mentioned later.

The annular body of the rotary transformer on the stationary section opposing the electricity-into-light conversion element 113 also has the second groove 119b in the second transformer core 114 and is processed to have, for example, a curved surface in cross-section. The second groove 119b is provided therein with the optical fiber 115 mentioned later. A light-into-electricity conversion element 131 mentioned later is disposed on the end face of the optical fiber 115, and further, a visible light cutoff filter 118 is provided so as to cover the second groove 119b in order to block visible light entering the optical fiber 115 from the surroundings thereby preventing deterioration in the signal-to-noise ratio (S/N ratio). The filter 118 has properties to intercept a wavelength out of the sensitivity region of the electricity-into-light conversion element 113, the optical fiber 115 and the light-into-electricity conversion element 131 (light detecting means) mentioned later, for example, a wavelength of 600 nm or less.

Moreover, the second groove 119b is processed to have a curved surface, whereby light which is emitted from the electricity-into-light conversion element 113 mentioned later but does not directly enter the optical fiber efficiently is adapted to enter the optical fiber 115 from the surroundings due to reflection on the curved surface. Therefore, even if accuracy of positioning the rotary section and the stationary section is lowered, or even if the rotary section and the stationary section are shifted in the axial direction, only a slight influence is given to accuracy of torque measurement.

The optical fiber mentioned herein includes, for example, a core made of norbornene resin containing photopigment and a cladding provided outside the core and having a lower refractive index than the core, and further a transparent or translucent protective layer provided outside the cladding and having anticorrosive and heat resistant properties. This optical fiber has properties to transmit light through the core when light is shed onto the side surface of this optical fiber, and shows a peak value of light transmission efficiency for a wavelength of around 650 nm.

Figure 3:
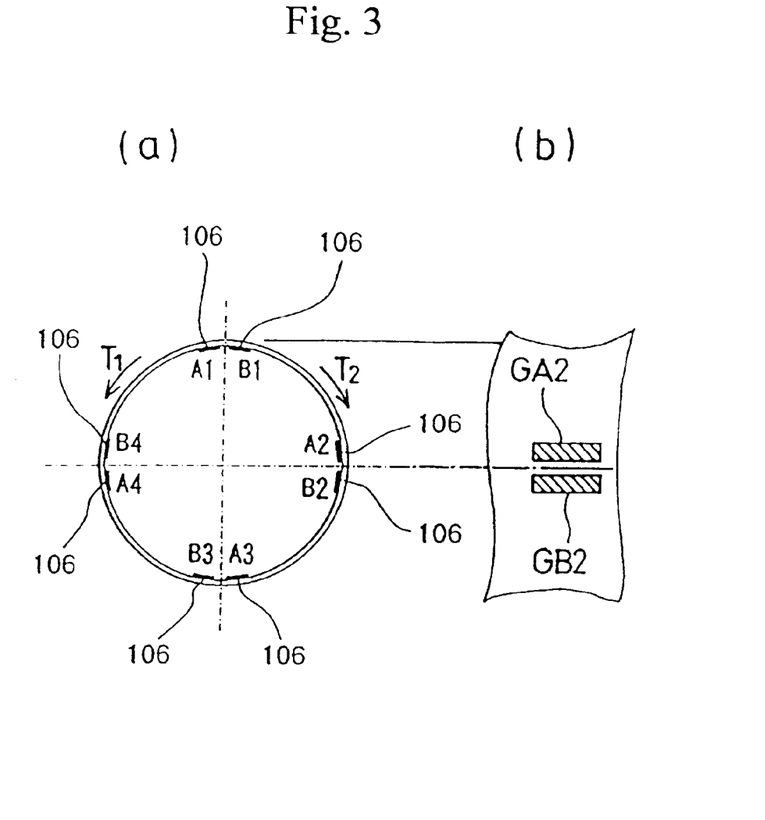
FIGS. 3(a) and 3(b) show positions of strain gages attached to an inner circumference of a cylinder.

FIGS. 3(a) and 3(b) show positions of strain gages 106 disposed on the inner circumference of a distortion generating body 100, FIG. 3(a) shows a view of a section of the hollowed cylinder at the bottom of the open space and FIG. 3(b) shows a view of an inner circumference of the hollowed cylinder. The thinnest part of the distortion generating body 100 is positioned at the very bottom of the U-defined open space. The strain gages 106 are attached at equal intervals to the inner circumferential surface of the cylinder at the spot located corresponding to the thinnest part which is the center of the bottom surface arched. Four pairs of the strain gages are attached with each pair consisting of gages A and B and disposed at each of following four positions: a position A1/B1, a position A3/B3 opposing the position A1/B1 across the central axis of the cylinder, a position A2/B2 rotated on the central axis by 90° from the position A1/B1 and a position A4/B4 opposing the position A2/B2. So, a total of eight pieces of the strain gages are attached. The strain gages are coated with butyl rubber to be moisture-proofed, then bonded with silicon.

Figure 4:
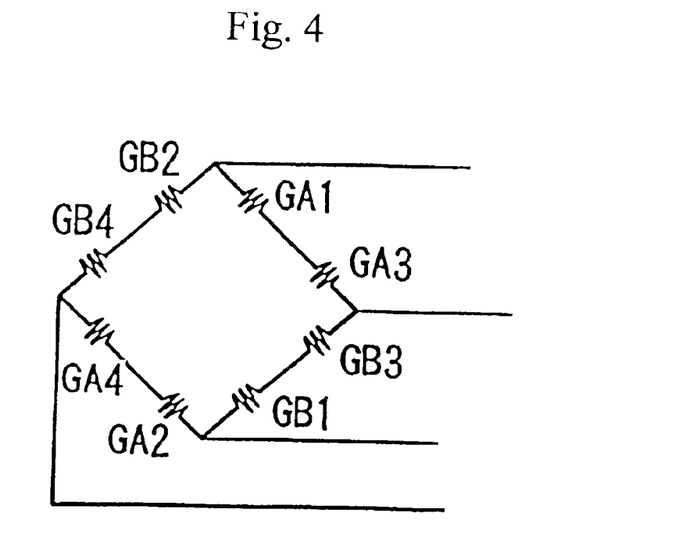
FIG. 4 shows relation between the strain gages attached to the internal face of the cylinder and each side of a Wheatstone bridge circuit.

FIG. 4 shows the relation between a Wheatstone bridge circuit 618 constituted by attached strain gages and the gages. The Wheatstone bridge circuit 618 is formed so as to distinguish a strain gage for a compressive strain from a strain gage for a tensile strain when shear force is applied to the distortion generating body 100 and combine outputs of changes in resistance of the both strain gages.

In other words, the pair of gages A and B has a pattern inclined in the direction of 45°, respectively, in order to detect the compressive strain and the tensile strain generated by torsion and is arranged so that with counterclockwise torque T1, GAn(n=1 to 4) receives the tensile strain and GBn(n=1 to 4) receives the compressive strain, whereas with clockwise torque T2, GBn(n=1 to 4) receives the tensile strain and GAn(n=1 to 4) receives the compressive strain.

Such gages are constituted as a Wheatstone bridge circuit 618 with the gages receiving the same strain being positioned at respective sides opposing each other. In other words, in gages GA1 and GA3 attached respectively to the position A1 and the position A3 opposing the position A1, gages GB1 and GB3 attached respectively to the position B1 adjacent to the position A1 and the position B3 opposing the position B1, gages GA2 and GA4 attached respectively to the position A2 rotated on the central axis from the position A1 by 90° and the position A4 opposing the position A2, and gages GB2 and GB4 attached respectively to the position B2 adjacent to the position A2 and the position B4 opposing the position B2, the gages GA1 and GA3 are connected to each other in series to form one side and the gages GA2 and GA4 are connected to each other in series to form one opposing side. Similarly, the gages GB1 and GB3 are connected to each other in series to form another side and the gages GB2 and GB4 are connected to each other in series to form another opposing side, whereby the Wheatstone bridge circuit 618 is constituted.

Figure 6:
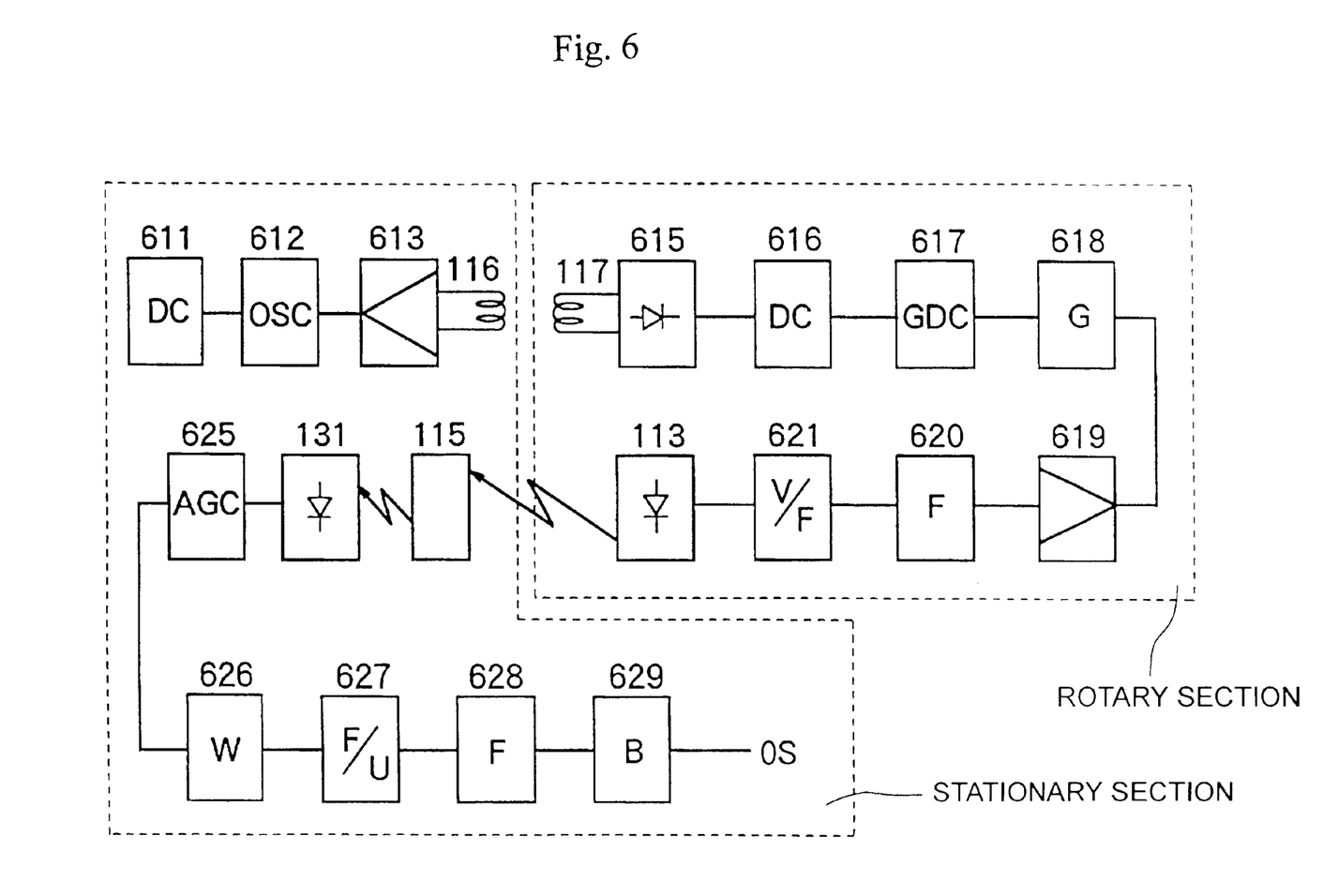
FIG. 6 is a block diagram of a circuit configuration of the rotary section and the stationary section in the torque measuring device according to the invention.

The gage GA1 is connected to the gage GB2 and the gage GB1 is connected to the gage GA2, and power of a power supply circuit 617 for the strain gage shown in FIG. 6 is impressed to each connection as mentioned later to serve as a power source for the Wheatstone bridge circuit 618. Similarly, the gage GA3 is connected to the GB3 and the GB4 is connected to the GA4, and input terminals of an amplifier 619 shown in FIG. 6 are connected to each connection to constitute an output of the Wheatstone bridge circuit 618.

FIGS. 5(a), 5(b) and 5(c) are explanatory views of positional relation between the optical fiber and the light-into-electricity conversion elements 131. As shown in FIG. 5(a), the light-into-electricity conversion elements 131, such as phototransistors or photodiodes being sensitive to a region out of a wavelength of visible light, e.g. a region at a peak wavelength of 900 nm of light conversion efficiency or a region of a range of light receiving wavelength from 420 nm to 1100 nm, are disposed close to the end of the optical fiber 115.

In order to keep out noise due to visible light coming from the outside at the connection between the light-into-electricity conversion elements 131 and the optical fiber 115, the light-into-electricity conversion elements 131 and the optical fiber 115 are both disposed in the second groove 119b in a second transformer core 114 on the stationary section.

signal light from the electricity-into-light conversion element 113 made incident on the circumference of the optical fiber 115 goes through its core and is converted from an optical signal into an electrical signal with the light-into-electricity conversion element 131 such as a photodiode.

Figure 5:
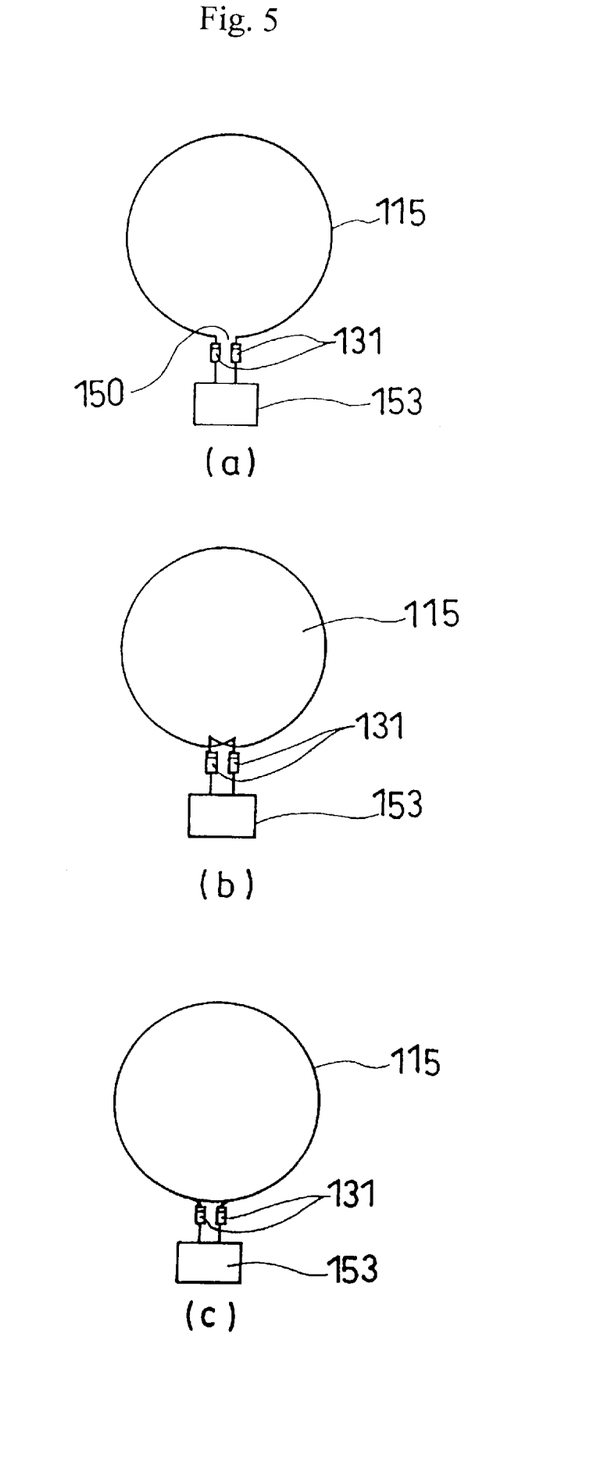
FIGS. 5(a), 5(b) and 5(c) are explanatory views of positional relation between an optical fiber and light-into-electricity conversion elements attached thereto.

Needless to say, the light-into-electricity conversion element 131 may be provided to one end of the optical fiber 115, or to both ends as shown in FIG. 5 in order to increase the sensitivity. And in FIG. 6 showing the constitution of circuits on the rotary section and the stationary section to be described later, an AGC circuit 625 needs to be made to operate in accordance with the number of the light-into-electricity conversion elements 131, one or two.

Furthermore, the sensitivity of the electricity-into-light conversion element 113 may be improved by providing a plurality of electricity-into-light conversion elements 113 in the circumference on the rotary section. In such a case, the positions of the electricity-into-light conversion elements 113 in the circumference on the rotary section are not particularly specified, but they may be uniformly positioned in the circumference in view of convenience in manufacturing and balance in rotation.

In a case where only one turn of the optical fiber 115 is arranged with respect to the light-into-electricity conversion elements 131 as shown in FIG. 5(a) within the second groove 119b of the annular body on the stationary section, there is inevitably generated a part (non-receiving part) 150 where an optical signal from the electricity-into-light conversion element 113 can not be received. The non-receiving part 150 is eliminated as follows.

As shown in FIG. 5(b) the optical fiber is arranged with an overlap and crossed at the part 150 shown in FIG. 5(a). Or as shown in FIG. 5(c) the optical fiber 115 is wound in a plurality of turns within the second groove 119b, which not only eliminates the non-receiving part but also increases efficiency of receiving optical signal from the electricity-into-light conversion elements.

Needless to say, the light-into-electricity conversion element 131 does not have to be arranged together with the optical fiber in the second groove 119b provided in the second transformer core 114 on the stationary section. If not, a part exposed to surrounding visible light around the connecting part with the light-into-electricity conversion element 131 is constructed so as to be covered, for example, with a shield tape, an opaque sleeve or the like thereby intercepting the surrounding visible light so that the optical fiber and electricity-into-light conversion elements do not absorb light other than an optical signal.

When the strain gages GAn and GBn (n=1 to 4) attached to the rotary section undergo changes in resistance due to variations in the torque, output voltage of the Wheatstone bridge circuit 618 constituted by the strain gages changes. How to convert this output voltage change into an optical signal to be emitted from the electricity-into-light conversion element 113 on the rotary section will be explained with reference to FIG. 6.

FIG. 6 is a block diagram showing a circuit constitution on the rotary section and the stationary section. A numeral 618 in FIG. 6 denotes the Wheatstone bridge circuit 618 made by the strain gages GAn and GBn (n=1 to 4). The power source of the Wheatstone bridge circuit 618 is obtained from a power source circuit 617 for strain gage, where alternating voltage induced in the secondary windings 117 shown in FIG. 2, that is, the secondary windings 117 on the rotary section in FIG. 6 is rectified and smoothed at a circuit 615 into a direct current with little ripple voltage, and further the power source voltage is minimized in fluctuation by a stabilizer power source circuit 616, thereby providing a voltage required for the Wheatstone bridge circuit 618.

Power is transmitted to a secondary winding 117 of the rotary transformer from a primary winding 116 of the rotary transformer opposing the secondary winding 117, and power is supplied to the primary winding 116 by oscillating volts alternating current of a frequency band of around 15 to 20 kHz at an oscillating circuit 612 receiving a power source from a power supply 611.

The output of the Wheatstone bridge circuit 618 is amplified with the amplifier 619 and have noise of excess frequency components eliminated at a filter circuit 620, then is converted into a frequency modulated signal by a voltage-to-frequency converter (V/F converter) 621 that converts voltage into frequency in order to remove the influence of a non-linear shape of a light emitting diode 113, the optical fiber 115 and the photodiode 131 as a light-into-electricity conversion element, which are used afterwards.

On the stationary section, as mentioned above, the optical fibers 115 are arranged in such a manner as to substantially encircle the outer circumference of the electricity-into-light conversion element 113 on the rotary section rotating about the axis. Accordingly, an optical signal emitted by the electricity-into-light conversion element 113 is always received by the optical fiber 115 and a frequency modulated optical signal is converted into an electrical signal by the photodiode 131 as the light-into-electricity conversion element provided at the end surface shown in FIG. 5.

Since the electrical signal received has a small amplitude, the amplitude fluctuation is adjusted at an AGC circuit (Automatic Gain Control Circuit) 625 and the amplitude is amplified to a logic level. The amplified signal passes a waveform-shaping circuit 626, has its frequency change converted into voltage change at a frequency-to-voltage converter (F/V converter) 627 and has unnecessary noise components removed at a low pass filter circuit 628. For the low pass filter 628, for example, a known secondary or tertiary Butterworth filter or the like is used. And, the low pass filter 628 is connected to an output buffer circuit 629 and a measured value of torque is obtained at an output terminal OS.

By using an above described device for measuring torque of a rotating body, the torque is measured as follows. A connecting member at a driving side connected to drive line between a measuring roller of a chassis dynamo rotated, for example, by a wheel of a vehicle and a load such as a dynamometer, a brake mechanism, or the like is connected to the outer end of the driving flange 101 by means of a threaded screw hole 103. A numeral 102 denotes a driven flange to which a load member of the drive line is connected by means of a threaded screw hole 104. A sensor with a strain gage 618 is disposed on the inner circumferential surface of a half-blindly hollowed cylinder having a circumferential wall configured in section to form a U-defined open space between the flanges and having a prescribed thickness and a prescribed diameter at a very bottom of the open space. The sensor converts a physical quantity according to torque acting on the hollowed cylinder into an electrical signal.

And the electrical signal is frequency modulated with a voltage-to-frequency converter 621 and then converted into an optical signal, and is transmitted to the stationary section by the optical signal conversion means 113 comprising at least one electricity-into-light conversion element which is provided in the first groove 119a of the first transformer core provided on the outer circumference of the driven flange and which emits light according to output of a torque detecting means. The optical signal transmitted from the rotary section is made incident on the circumference of the optical fiber 115 provided in the second groove 119b of the second transformer core opposing the driven flange. The light made incident on the circumference of the optical fiber is transmitted to the end of the optical fiber. The optical signal detection means 131 for receiving light which has reached the end converts the light into an electrical signal. Then, the electrical signal is waveform-shaped at the waveform-shaping circuit 626 and the frequency modulated signal is demodulated into an analogue voltage by the frequency-to-voltage converter 627 and passes through the low pass filter circuit 628 and the output buffer circuit 629 to be retrieved as an analogue signal for torque measurement.

What is claimed is:

1. A device for measuring torque of a rotating body, comprising:
   a rotary section including a driving flange and a driven flange on both ends thereof;
   a half-blindly hollowed cylinder having a circumferential wall configured in section to form a U-defined open space between the flanges and having a prescribed thickness and a prescribed diameter at a very bottom of the open space;
   a torque detecting means disposed on an inner circumferential surface of the cylinder portion and adapted to convert a physical quantity corresponding to a value of torque acting on the cylinder portion into an electrical signal;
   a stationary section opposing an outer circumference of the driven flange;
   a set of rotary transformers comprising a first transformer core which is formed on the outer circumference of the driven flange and has a first groove and a second transformer core which is formed on an inner circumference of the stationary section and has a second groove;
   an optical signal conversion means composed of at least one electricity-into-light conversion element, disposed in the first groove and adapted to emit light according to an output of the torque detecting means;
   a light transmission means composed of an optical fiber, disposed in the second groove and adapted to receive the light from the optical signal conversion means; and
   a light detecting means to detect the light transmitted from the light transmission means.

2. The device for measuring torque of a rotating body according to claim 1, wherein the light detecting means comprises a light-into-electricity conversion element provided on at least one end surface of the optical fiber.

3. The device for measuring torque of a rotating body according to claim 1, wherein the light detecting means is disposed, together with the light transmission means, in the second groove formed on the second transformer core which opposes the driven flange and completes the set of rotary transformers with the first transformer core.

4. The device for measuring torque of a rotating body according claim 1, wherein the optical signal conversion means provided in the first groove and the light transmission means and the light detecting means both provided in the second groove are disposed so as not to protrude beyond an interface defined by the first and second transformer cores.

5. The device for measuring torque of a rotating body according to claim 1, wherein the light transmission means and the light detecting means both provided in the second groove are covered with a visible light cutoff filter.

6. The device for measuring torque of a rotating body according to claim 1, wherein the light transmission means is set in such a way as to be wound in at least one turn within and along the second groove.

7. The device for measuring torque of a rotating body according to claim 2, wherein the light detecting means is disposed, together with the light transmission means, in the second groove formed on the second transformer core which opposes the driven flange and completes the set of rotary transformers with the first transformer core.

8. The device for measuring torque of a rotating body according claim 2, wherein the optical signal conversion means provided in the first groove and the light transmission means and the light detecting means both provided in the second groove are disposed so as not to protrude beyond an interface defined by the first and second transformer cores.

9. The device for measuring torque of a rotating body according to claim 2, wherein the light transmission means and the light detecting means both provided in the second groove are covered with a visible light cutoff filter.

10. The device for measuring torque of a rotating body according to claim 2, wherein the light transmission means is set in such a way as to be wound in at least one turn within and along the second groove.

11. The device for measuring torque of a rotating body according claim 3, wherein the optical signal conversion means provided in the first groove and the light transmission means and the light detecting means both provided in the second groove are disposed so as not to protrude beyond an interface defined by the first and second transformer cores.

12. The device for measuring torque of a rotating body according to claim 3, wherein the light transmission means and the light detecting means both provided in the second groove are covered with a visible light cutoff filter.

13. The device for measuring torque of a rotating body according to claim 3, wherein the light transmission means is set in such a way as to be wound in at least one turn within and along the second groove.

14. The device for measuring torque of a rotating body according to claim 4, wherein the light transmission means and the light detecting means both provided in the second groove are covered with a visible light cutoff filter.

15. The device for measuring torque of a rotating body according to claim 4, wherein the light transmission means is set in such a way as to be wound in at least one turn within and along the second groove.

16. The device for measuring torque of a rotating body according to claim 5, wherein the light transmission means is set in such a way as to be wound in at least one turn within and along the second groove.

17. A method for measuring torque, comprising the steps of:

setting a torque detecting means, which converts a physical quantity corresponding to a torque value into an electrical signal, on an inner circumferential surface of a cylinder portion at a place where the cylinder portion has a smallest thickness in its circumferential wall between a driving flange and a driven flange;

converting the electrical signal from the torque detecting means into an optical signal by an electricity-light signal conversion means and transmitting the optical signal to a stationary section;

directing the optical signal transmitted from a rotary section onto a side face of an optical fiber provided in a groove formed on a transformer core which is provided in the stationary section in such a manner as to oppose the driven flange, thereby converting the optical signal into an electrical signal;

subjecting the electrical signal to a prescribed waveform-shaping process for a frequency modulated signal;

demodulating the frequency modulated signal; and retrieving the demodulated signal as an analogue signal by way of a prescribed circuit.

* * * * *